Figure 1:
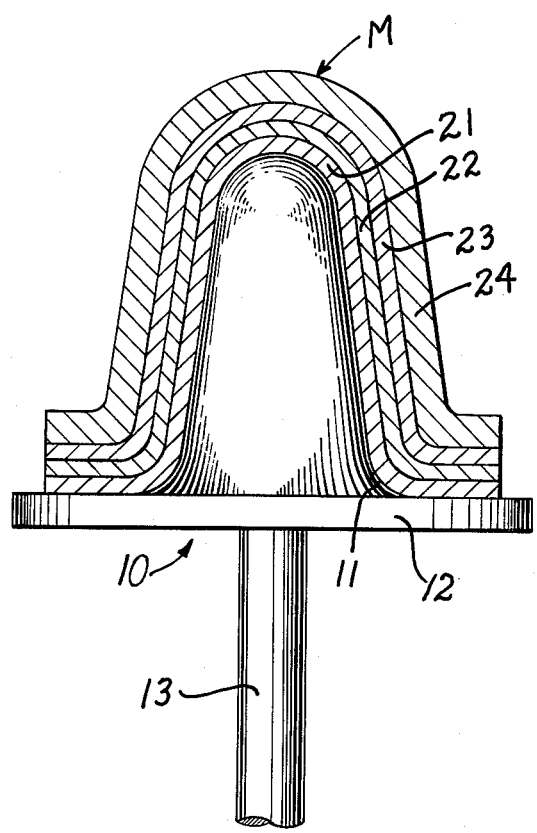

United States Patent Office 3,204,917
Patented Sept. 7, 1965

3,204,917
LAYERED MOLD
Ray S. Richards, Toledo, Ohio, assignor to Owens-Illinois Glass Company, a corporation of Ohio
Filed Dec. 16, 1960, Ser. No. 76,241
5 Claims. (Cl. 249—116)

This invention relates generally to molds, and more particularly to the manufacture of molds wherein a plurality of layers of metal are sequentially deposited on a mandrel.

Molds for use in the glass forming industry are required to have forming surfaces of high wear and oxidation resistance at elevated temperatures. Also, these forming surfaces must conform to close tolerances, and it is desirable that they have low thermal expansion characteristics. The mold body must have sufficiently high thermal conductivity so as to conduct away the heat of the forming operation and avoid the formation of localized "hot spots" on the forming surfaces which adversely affect the glass forming operation. Furthermore, molds for use in the glass forming industry are required to have sufficient mechanical strength to withstand the continuous operation which is required of them.

It is the practice in the glass forming industry to coat the forming surfaces of the glass forming molds and the plungers by spraying onto these surfaces a suitable hard surfacing alloy such as a nickel-chromium alloy, to give a hard, wear-resistant surface having low wear and oxidation rates at elevated temperatures. For the plunger or male member, this process is satisfactory, but it is unsatisfactory for coating a cavity mold, because the apparatus for spraying the molten alloy onto the forming surface cannot be inserted sufficiently far into the mold to deposit a uniform coating on the entire forming surface. Consequently, the present practice of making cavity molds in the glass forming industry is to laboriously machine these molds out of a solid block of an expensive alloy such as stainless steel or out of a relatively less adequate material such as cast iron. In addition to having lower wear and oxidation resistance at elevated temperatures than that provided by a nickel-chromium alloy coated mold, molds made out of stainless steel have relatively poor thermal conductivity. The cast iron molds, while having somewhat better thermal conductivity than stainless steel molds, are significantly less resistant to wear and oxidation at elevated temperatures.

This invention is directed primarily to a method of forming a mold, and a mold having a forming surface comprising a hard, wear-resistant metallic material such as a nickel-chromium alloy and a body portion having relatively high thermal conductivity. My invention, in its preferred form, comprises spraying a molten nickel-chromium alloy onto an appropriately shaped mandrel to form a first layer, and then spraying onto the nickel-chromium alloy layer additional layers of molten alloys or metals to form the remainder of the mold body. At least one of the additional layers is formed of a metal or metallic alloy having relatively high thermal conductivity. The thickness and composition of these additional layers are designed to give mechanical strength and high thermal conductivity to the mold.

Accordingly, it is an object of my invention to provide a cavity mold which has a forming surface having high wear and oxidation resistance at elevated temperatures.

Another object of my invention is to provide a relatively inexpensive mold having a body portion which has a higher rate of thermal conductivity than previously possible.

A further object of my invention is to provide a method for forming a multi-layered mold having high wear and oxidation resistance at elevated temperatures, and a high rate of thermal conductivity through its body portion.

The specific nature of this invention, as well as other objects and advantages thereof, will become apparent to those skilled in the art from the following detailed description taken in conjunction with the annexed sheet of drawings, on which, by way of example only, the preferred embodiment of this invention is illustrated.

In the drawings:

FIG. 1 is a side elevational view, partly in section, showing a multi-layered cavity mold formed on a mandrel.

The initial step in the practice of my invention is the formation of an appropriately shaped mandrel 10 on which the mold M is formed. The mandrel is preferably fabricated from a relatively rigid material, such as mild or stainless steel, and is machined to have an outer peripheral surface 11 which is shaped to correspond to the desired inner or forming surface of the mold. The mandrel 10 also has a support shaft 13 and a radially outwardly extending shoulder portion 12 which is adapted to support the flange portion of the mold as it is formed.

The mold is formed by sequentially coating or depositing on the mandrel a plurality of layers of metallic material, either metallic alloys or pure metals, so as to build up a multi-layered mold. The preferred method of depositing these layers is by the conventional method of spraying the metallic alloys or metals onto the surface in a molten state. It is well known how to apply a coating of metal to objects by the use of a metal spray gun, i.e., a device by which the metal particles, in a molten state, are directed against the surface of the object by a blast of air or other gas. In the type of spray gun usually used for this purpose, a rod or wire of solid metal is fed progressively into a melting zone and as rapidly as it melts is propelled against the surface to be sprayed by a suitably directed blast of air or other gas. Another form of gun which may be so employed feeds particles of powdered metals to the heating zone and these are propelled upon the surface by a suitably directed blast of air or other gas. Unless spraying of the molten metal is done in a closed atmosphere comprising an inert or reducing gas, the molten metal particles will have formed thereon an oxide film or skin as they travel toward the objects to be coated. Where a layer of the mold is formed of a pure metal, that layer may be formed or deposited by conventional electrolytic disposition. This latter method has the advantage that it eliminates the formation of oxides in the layer, but has the disadvantage that where a layer of substantial thickness must be deposited, it is very time consuming.

The mandrel 10 is heated to form an adherent oxide film thereon to aid the molten metallic alloy, which is sprayed on to form the first layer of the mold, to adhere to the surface of the mandrel. The oxide film assists the molten alloy in sticking to the surface of the mandrel as it is sprayed against the mandrel. The adherent oxide film is formed on the mandrel by heating the mandrel to the range of 300° F. to 1200° F. in the presence of oxygen. It may be mentioned at this point that it is preferable to apply the first layer to the mandrel while the mandrel is still in a heated condition so as to minimize shrinkage stresses which occur when the various layers of the mold cool. Also, where an adherent oxide film is to be formed on a mandrel, it is possible and desirable to polish the surface of the mandrel to a smooth finish. The smooth surface of the mandrel results in the interior surface of the mold having a relatively smooth finish. Another method of promoting sticking or adherence of a sticking coat to the mandrel is to roughen the surface of the mandrel by acid etching or sand blasting. This latter mentioned method is less desirable in that the resultant mechanical interlock between the surface of the mandrel and the inner surface of the mold prevents the mold from being easily removed from the mandrel.

The initial alloy which is sprayed onto the mandrel is preferably a nickel-chromium alloy having a boron and/or silicon fluxing agent, and is selected for the purpose of providing a high wear and oxidation resistant surface at elevated temperatures. The initial layer, comprising the nickel-chromium alloy is sprayed onto the mandrel to a thickness of preferably not less than 0.007 inch and not more than 0.100 inch. A typical layer would be 0.030 inch thick. The initial layer is sprayed onto a generally uniform thickness, but in areas of the mold, such as the corner portions of the mold, which will be exposed to the greatest wear, the thickness of the initial or inner layer is preferably increased to two to three times its normal thickness elsewhere in the mold.

After the initial or inner layer has been deposited on the mandrel, a second metallic alloy or metal is sprayed onto the initial layer to form a second layer. The second layer, which may be termed a barrier layer, is selected for the purpose of giving mechanical strength to the mold and preventing gross alloying between the inner layer and the outer layer during the heat treating operation, which will be described later. The second layer is preferably formed of an iron base alloy which has a higher melting point than the first layer, and which alloys slightly with the first layer when the inner layer is heated to near its melting point, thereby promoting bonding between the inner faces of the two layers. It is to be understood, of course, that other alloys, other than iron base alloys, may be used to form the barrier or second layer. For example, cobalt, nickel, and vanadium base alloys having relatively high mechanical strength, a substantially higher melting point than the inner layer, and which are capable of alloying slightly with the inner layer, can be used. The second layer is sprayed in a molten state onto the first layer to a thickness of preferably not less than 0.030 inch and not more than 0.250 inch thick. A typical layer is 0.125 inch thick. The second layer is generally of uniform thickness except in areas of maximum mechanical stress, such as the flange portion of the mold, where the second layer may be 0.250 inch thick.

In some instances, such as where the mold will be subjected to rapid or extreme temperature cycling, a third or transitional layer can be applied between the second layer and the outer layer, which will be described later, for the purpose of reducing the effect of the thermal expansion differential between the second and outer layers. When the second layer is formed of an iron base alloy, I have found that an iron-copper alloy can be used to form the transitional layer. The iron-copper alloy can be formed by mixing together the desired percentages of copper and iron powders, and is applied by spraying the powders in a molten state onto the second layer by means of a conventional spray gun. The iron-copper alloy can be applied in a plurality of layers or steps with each succeeding layer having an increasing percentage of copper.

The outer layer is formed by spraying onto the second layer, or where applicable the transitional layer, a molten metal or metallic alloy having a relatively high rate of thermal conductivity. The outer layer is preferably formed of commercially pure copper which is sprayed on to a thickness of approximately 0.500 inch. Other conventional metallic materials, either metallic alloys or metals, can be used to provide a suitably conductive coating. It is only essential that they have relatively high thermal conductivity and be capable of alloying slightly with the adjacent layers. This outer layer of relatively high thermal conductivity provides a heat pump which serves to equalize the temperature differences of the inner surface of the first layer of the mold, which occur during the forming operation.

After the outer layer has been applied, the composite mult-layered mold is removed from the mandrel and subjected to a heat treating operation. The heat treating operation comprises heating the mold to an elevated temperature, maintaining the mold at that temperature for the desired length of time, and then cooling the mold to room temperature. The elevated temperature, to which I have found it perferable to heat the mold, is that temperature at which the inner layer is between its solidus and liquidus states. For a nickel-chromium alloy this temperature is generally in the range between 1800° F. and 2000° F. For a particular metallic material this temperature can be determined experimentally by conventional means or determined from standard texts. This type of heat treating is commonly referred to as liquid phase sintering. At the aforementioned elevated temperature, the nickel-chromium alloy inner layer is partially liquid, and the particles thereof that impinged upon the surface of the material to form platelets flow together to form a smooth surface. The oxide films formed during the spraying operation are broken up so as to improve the strength and ductility of the inner layer. This heat treating operation also has a significant effect on the structure of the layer which may comprise copper or other suitably conductive metallic material. The copper, for example, recrystallizes forming equi-axed grains and spheroidizes the trapped oxides so as to improve the thermal conductivity of the outer layer. It may be noted again that it is necessary for the second layer to have substantially higher melting point than that of the inner layer to prevent gross alloying which would otherwise occur when the inner layer was heated to near its melting point, and that the second layer must be capable of alloying only slightly with the inner layer, and where applicable outer layer, during the heat treating operation.

After the mold is removed from the furnace and allowed to cool to room temperature, it is machined to final form. The interior surface of the mold is polished by conventional means, and the exterior surface of the mold is machined to the desired configuration, which may include cooling fins. Where desired, a cooling coil may be wound around the mold and brazed onto the exterior surface of the mold.

As an example of the foregoing method and an article produced by the foregoing method, a mandrel 10 is formed to the desired shape out of stainless steel. The mandrel is then heated in the presence of oxygen to about 1200° F. to form an adherent oxide film thereon. The mandrel is allowed to cool until it is in the temperature range of 375° F. to 800° F. In this temperature range the mandrel is coated by spraying (by conventional means) onto the mandrel, to form a first layer 21, a molten nickel-chromium alloy of the following composition:

| Name: | Percent by weight |
|---|---|
| Iron | 3.0 |
| Chromium | 17.0 |
| Carbon | 0.5 |
| Silicon | 4.0 |
| Boron | 3.0 |
| Copper | 2.0 |
| Molybdenum | 2.0 |
| Nickel | Balance |

The above composition is basically a nickel-chromium alloy having boron and silicon fluxing agents and an initial melting point of about 1800° F.

The first coating or layer is sprayed to a thickness of 0.030 inch. In the areas of greatest wear, which are well known in the art, the thickness of the first layer can be increased up to 0.100 inch. The first layer is immediately covered with an iron base alloy which is sprayed in a molten state onto the first layer to form a second layer 22. The iron base alloy is of the following composition:

| Name: | Percent by weight |
|---|---|
| Nickel | 4.00 |
| Carbon | 0.04 |
| Manganese | 2.00 |
| Phosphorus | 0.03 |
| Chromium | 1.50 |
| Molybdenum | 1.30 |
| Iron | Balance |

The above-described iron base alloy has a melting point of approximately 2732° F. This iron base alloy, which forms a second coating or layer 22, is sprayed onto the first layer to a thickness of approximately 0.125 inch. Areas of maximum mechanical stress, which are well known in the molding art, are strengthened by spraying the second layer to a greater thickness, such as 0.250 inch. Such an area is the flange portion of the mold.

A transitional layer 23 of metal is applied to the second layer by spraying a mixture of iron and copper powders, in a molten state, onto the second layer. The first portion of the transistional layer is composed of 75 percent iron powder and 25 percent copper powder by weight and is sprayed on to a thickness of approximately 0.010 inch. The second portion of the transitional layer is composed of 50 percent iron powder and 50 percent copper powder by weight and is sprayed on to a thickness of approximately 0.010 inch. The third portion of the transistional layer is composed of 25 percent iron powder and 75 percent copper powder by weight and is sprayed to a thickness of 0.010 inch.

The remainder of the mold is built up by spraying molten copper onto the transitional layer to form an outer layer 24 having a thickness of approximately 0.500 inch. The copper has a melting point of approximately 1935° F.

The composite mold or resultant metal is then removed from the mandrel and placed in a furnace at 1900° F. for approximately thirty minutes. After the mold has been removed from the furnace and cooled to room temperature, it is finished by machining the flange and interior forming surface to a sharp corner, polishing the interior or forming surface, and machining the exterior surface to the desired configuration, which can include cooling fins formed in the outer copper layer.

While I have herein shown and described what I conceive to be the most desirable embodiments of my invention, it is to be understood that the various details thereof may be modified through a wide range without departing from the principles of my invention, and it is not, therefore, the purpose to limit the patent granted hereon otherwise than necessitated by the scope of the appended claims.

I claim:

1. A mold comprising an inner layer formed of a relatively hard, wear-resistant metallic alloy having oxidation resistance at elevated temperatures, an outer layer formed of a metallic material having relatively high thermal conductivity, and at least one intermediate layer disposed adjacent to said inner layer, said intermediate layer comprising a metallic material having a melting point substantially higher than the melting point of said inner layer, said inner and intermediate layers being alloyed together at their interface to form a metallurgical bond.

2. A mold comprising an inner layer formed of a nickel-chromium alloy having a fluxing agent, an outer layer comprising a metallic material having relatively high thermal conductivity, and at least one layer disposed between said inner and outer layers, said one layer comprising a metallic material having a melting point substantially above the melting point of said inner and outer layers, said one layer being alloyed with its adjacent layers at the respective interfaces.

3. A mold comprising an inner layer formed of a nickel-chromium alloy having a fluxing agent, an outer layer comprising a metallic material having relatively high thermal conductivity, and at least one layer deposited between said inner and outer layers, said one layer comprising an iron base alloy having a melting point substantially above the melting point of said inner layer, said one layer being alloyed with its adjacent layers at the respective interfaces.

4. A mold having a cavity comprising an inner layer formed of a nickel-chromium alloy having a thickness of 0.007 to 0.100 inch, an outer layer formed of copper, and at least one layer disposed between said inner and outer layers, said one layer formed of an iron base alloy having a melting point substantially above that of said inner layer, and said one layer having a thickness of 0.030 to 0.250 inch, said one layer being alloyed with said inner layer at their interface to form a metallurgical bond.

5. A mold having an inner layer formed of a nickel-chromium alloy having a fluxing agent, a second layer formed of an iron base alloy, a third layer formed of an iron-copper alloy, and an outer layer formed of copper, said layers being alloyed together at their respective interfaces.

References Cited by the Examiner

UNITED STATES PATENTS

| 1,965,242 | 7/34 | Kelly | 65—364 |
| 2,517,762 | 8/50 | Brennan | 22—204 |
| 2,629,907 | 3/53 | Hugger | 22—190 |

FOREIGN PATENTS 405,889  2/34  Great Britain.

DONALL H. SYLVESTER, *Primary Examiner.*

ARTHUR P. KENT, *Examiner.*